(12) United States Patent
Sharma et al.

(10) Patent No.: US 12,535,781 B2
(45) Date of Patent: Jan. 27, 2026

(54) AUTOMATIC CONTROL GROUP GENERATION

(71) Applicant: PayPal, Inc., San Jose, CA (US)

(72) Inventors: Nitin S. Sharma, San Francisco, CA (US); Mozhdeh Rouhsedaghat, Los Angeles, CA (US)

(73) Assignee: PayPal, Inc., San Jose, CA (US)

( * ) Notice: Subject to any disclaimer, the term of this patent is extended or adjusted under 35 U.S.C. 154(b) by 1077 days.

(21) Appl. No.: 17/644,692

(22) Filed: Dec. 16, 2021

(65) Prior Publication Data

US 2023/0195056 A1  Jun. 22, 2023

(51) Int. Cl.
*G05B 13/02* (2006.01)
*G06N 3/088* (2023.01)
*G06Q 20/40* (2012.01)

(52) U.S. Cl.
CPC ........... *G05B 13/027* (2013.01); *G06N 3/088* (2013.01); *G06Q 20/4016* (2013.01)

(58) Field of Classification Search
CPC ... G05B 13/027; G06N 3/088; G06Q 20/4016
See application file for complete search history.

(56) References Cited

U.S. PATENT DOCUMENTS

| | | | |
|---|---|---|---|
| 11,556,746 B1 * | 1/2023 | Dasgupta | G06N 20/00 |
| 2012/0101930 A1 * | 4/2012 | Li | G06Q 40/00 |
| | | | 705/35 |
| 2012/0233127 A1 | 9/2012 | Solmer et al. | |
| 2013/0054603 A1 | 2/2013 | Birdwell et al. | |
| 2015/0238148 A1 | 8/2015 | Georgescu et al. | |
| 2015/0254555 A1 | 9/2015 | Williams, Jr. et al. | |
| 2018/0247200 A1 | 8/2018 | Rolfe | |
| 2021/0037048 A1 * | 2/2021 | Kurupati | H04L 63/1466 |
| 2021/0264466 A1 * | 8/2021 | Aggarwal | G06Q 30/0201 |

(Continued)

OTHER PUBLICATIONS

Camino (Machine Learning Techniques for Suspicious Transaction Detection and Analysis, Aug. 10, 2020, pp. 0-104) (Year: 2020).*

(Continued)

*Primary Examiner* — George Giroux
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed for automatically generating and updating a control group. In disclosed techniques, a server computer system trains, using a plurality of transactions, a machine learning model. During training the machine learning model learns a feature distribution of both a current set of control group (CG) transactions and a current set of non-control group (non-CG) transactions included in the plurality of transactions. The system inputs the current set of CG transactions into the trained machine learning model. Based on the output of the trained machine learning model for the current set of CG transactions, the system modifies the current set of CG transactions to generate an updated set of CG transactions. Based on the updated set of CG transactions, the server performs one or more preventative measures for a transaction processing system. The disclosed techniques may advantageously improve the accuracy e.g., of a transaction processing system.

20 Claims, 7 Drawing Sheets

(56) References Cited

U.S. PATENT DOCUMENTS

2021/0358626 A1* 11/2021 Nicula ................... G16B 20/00
2022/0214948 A1*  7/2022 Yeddu ................. G06F 11/3476

OTHER PUBLICATIONS

Chen et al. (Variational Autoencoders and Wasserstein Generative Adversarial Networks for Improving the Anti-Money Laundering Process, Jun. 2021, pp. 83762-83785) (Year: 2021).*
Vowels et al. (Targeted VAE: Structured Inference and Targeted Learning for Causal Parameter Estimation, Sep. 2020, pp. 1-17) (Year: 2020).*
Bao et al. (A deep learning framework for financial time series using stacked autoencoders and long-short term memory, Jul. 2017, pp. 1-24) (Year: 2017).*
Sadiq (CounterFactual Variational Autoencoders (CFVAE): Deep Latent Representations for Counterfactual Inference, May 2020, pp. 0-146) (Year: 2020).*
International Preliminary Report on Patentability for Application No. PCT/US2022/080618, mailed on Jun. 27, 2024, 8 pages.
Shi et al., "Adapting Neural Networks for the Estimation of Treatment Effects," arXiv:1906.02120v2 [stat.ML] Oct. 17, 2019, 14 pages.
Kuang et al., "Stable Prediction with Model Misspecification and Agnostic Distribution Shift*," The Thirty-Fourth AAAI Conference on Artificial Intelligence (AAAI-20); 2020, pp. 4485-4492.
International Search Report and Written Opinion for Application No. PCT/US2022/080618 mailed on Mar. 15, 2023, 13 pages.

\* cited by examiner

*Method 600*

Train, using a plurality of transactions, a machine learning model, where during training the machine learning model learns a feature distribution of both a current set of control group (CG) transactions and a current set of non-control group (non-CG) transactions included in the plurality of transactions.
610

Input, into the trained machine learning model, the current set of CG transactions.
620

Modify, based on output of the trained machine learning model for the current set of CG transactions, the current set of CG transactions to generate an updated set of CG transactions.
630

Perform, based on the updated set of CG transactions, one or more preventative measures for a transaction processing system
640

*Fig. 6*

AUTOMATIC CONTROL GROUP GENERATION

BACKGROUND

Technical Field

This disclosure relates generally to data security, and, more specifically, to techniques for automatically detecting anomalous behavior e.g., for improved security.

Description of the Related Art

As more and more transactions are conducted electronically via online transaction processing systems, for example, these processing systems become more robust in managing transaction data as well as detecting suspicious and unusual behavior. Many transaction requests, for example, may be generated with malicious in intent, which may result in wasted computer resources, network bandwidth, storage, CPU processing, monetary resources, etc., if those transactions are processed. Some transaction processing systems attempt to analyze various transaction data for previously processed and currently initiated transactions to identify and mitigate malicious behavior such as requests for fraudulent transactions.

BRIEF DESCRIPTION OF THE DRAWINGS

FIG. 6 is a flow diagram illustrating a method for automatically updating a control group, according to some embodiments.

DETAILED DESCRIPTION

Figure 1:
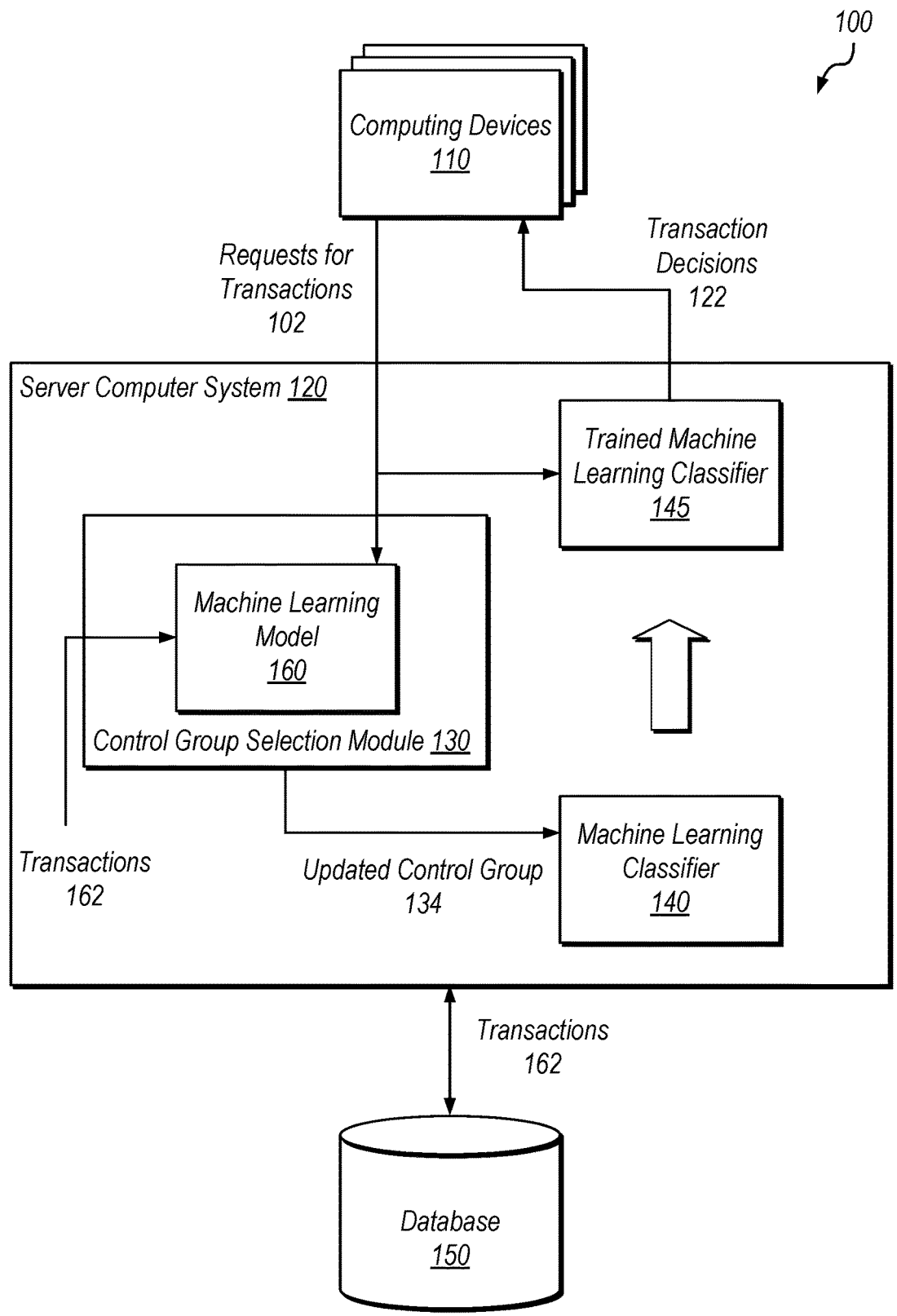
FIG. 1 is a block diagram illustrating an example system configured to automatically generate control groups, according to some embodiments.

Traditionally, control groups have been used during experimentation for comparison purposes to test the overall effectiveness of a new feature, characteristic, drug, etc. being introduced to an experimental group. As such, the accuracy of such experimentation depends on the representativeness of control group of examples relative to an overall population of examples. In the context of machine learning, control groups may be used to both train and test the overall accuracy of a machine learning model. Over time, however, a control group representing a given population (e.g., of users, transactions, patients, etc.) may no longer be representative of the overall population. For example, populations are generally temporal in nature and, as such, change with time. As one specific example, a population of transactions may increase in volume (e.g., during holiday months, the number of online electronic transactions increases significantly relative to non-holiday months), the types of transactions being conducted may change, etc.

In addition to becoming less representative over time, in some situations, control groups may introduce loss. In the context of online electronic transactions, as the overall population of transactions grows, the potential for loss associated with transactions that are included in the control group for this overall population increases. For example, because fraudulent transactions are often included in the control group (to represent that fraudulent transactions occur within the overall population) and because transactions included in the control group are automatically approved (authorized to proceed), these transactions cause a system processing such transactions to incur loss (e.g., financial loss). In this example, if one or more fraudulent transactions included in the control group are for a high dollar amount relative to other transactions, these transactions cause the transaction processing system to incur even greater loss than if such transactions were for a lower dollar amount.

The disclosed techniques use machine learning techniques to automatically generate and update control groups such that these control groups accurately represent the overall population they are intended to represent. In addition, while updating a control group, the system selects examples for the control group based on a particular feature. In the context of online electronic transactions, the system selects transactions for a control group based on a dollar amount feature in addition to selecting transactions that are highly representative of the overall transaction population to avoid loss associated with this feature. In particular, the disclosed techniques combine a neural network (e.g., a Dragonnet) with a VAE to learn the feature distribution of both a current set of control group (CG) of transactions and non-control group (non-CG) transactions (the rest of the transaction population that is not included in the current control group). During training, the neural network calculates propensity scores for transactions to predict whether these transactions are likely to be CG or non-CG transactions. As part of the propensity score calculation, the neural network also uses weights that are based on a dollar amount optimality (e.g., fraudulent transactions with low dollar amounts are weighted such that they are predicted to be control group transactions). Based on the prediction from the neural network, transactions are sent through either a CG portion of the neural network or a non-CG portion of the neural network. These two separate portions learn the feature distribution of the CG transactions and non-CG transactions, respectively. Based on the neural network knowing the feature distribution of non-CG population, the disclosed system uses the trained neural network to evaluate whether CG transactions are indeed representative of the overall transaction population and to alter the control group accordingly.

In some situations, traditional models used to automatically select transactions for a control group become biased over time. For example, if a control group selection model is more likely to select a fraudulent transaction for a control group than a non-fraudulent transaction, then this control group selection model has become biased when selecting transactions. The disclosed machine learning model used to select control group transactions alleviates model bias by learning the feature distribution of a current control group as well as the feature distribution of the overall transaction population (non-control group transactions) and evaluating transactions in the current control group using the portion of the machine learning model that has learned the feature distribution of the overall transaction population. As such, the disclosed machine learning model is able to accurately select representative examples for a control group (as well as remove unrepresentative examples).

In various situations, control groups may be used to provide a set of examples (e.g., 1.5-2.5% of the total population of examples) that is adequately representative of the overall population of examples. Further, control groups may be used to measure various benchmarks. In the context of electronic transactions, a control group may be used to measure: loss rates (e.g., how much money is PayPal losing on a daily, monthly, yearly, etc. basis), how well sub-populations are responding to fraud prevention measures compared to other sub-populations (e.g., transactions initiated in North America vs. transactions initiated in South America), whether greater numbers of fraud are occurring in a first geographic region as compared to a second geographic region, etc. Further, in the context of electronic transactions, the control group may be used to train a classifier model to classify transactions (as suspicious or not).

The disclosed techniques may advantageously improve the representativeness of control groups relative to the overall population of examples the control group is attempting to represent. In the context of online electronic transaction, this may, in turn, advantageously improve transaction security. For example, transaction classifiers trained using a control group of transactions generated using the disclosed techniques will more accurately detect suspicious or fraudulent transactions relative to transaction classifiers trained using control groups selected via traditional techniques (e.g., manually). In this example, the disclosed techniques decrease loss (e.g., financial) due to the higher catch rate of transaction classifiers trained using an automatically selected control group. Further in this example, the disclosed techniques decrease financial loss due to lower dollar amount transactions being included in the control group. In the context of a clinical trial, a control group of users selected using the disclosed techniques may advantageously be used to more accurately determine patients receive a drug (treatment group) and which patients will receive a placebo (control group).

As used herein, the term "control group" is intended to be construed according to its well-understood meaning in the context of machine learning, which includes a subset of a set of data that is representative of the set of data and that is used to train machine learning models. For example, a control group may include labeled transactions that have been authorized such that classifications for the transactions (e.g., fraudulent or non-fraudulent) are known (e.g., enough time has passed that fraudulent transactions included in this subset of transactions have been reported as fraudulent). In disclosed techniques, transactions included in a control group are selected from an overall population of transactions (e.g., transactions in the control group make up a portion of the overall transaction population). In disclosed techniques, a control group (including both fraudulent and non-fraudulent transactions) as well as a subset (including fraudulent transactions) of the non-control group transaction population are used to train a machine learning classifier to classify transactions. Once the classifier is trained, the disclosed techniques test the accuracy of this classifier using only transactions in the control group (both fraudulent and non-fraudulent). In some embodiments, transactions in the control group used for training are "out-of-time" transactions. For example, a first set of transactions included in the control group have timestamps in the year 2020, while a second set of transactions included in the control group have timestamps in the year 2021. In this example, control group transactions in the year 2020 are used to train the classifier, while control group transactions in the year 2021 are used to test the classifier.

Example Control Group Generation System

FIG. 1 block diagram illustrating an example system configured to automatically generate control groups. In the illustrated embodiment, system 100 includes one or more computing devices 110, database 150, server computer system 120, which in turn includes control group selection module 130, machine learning classifier 140, and trained machine learning classifier 145.

In the illustrated embodiment, server computer system 120 receives requests 102 to initiate transactions from one or more computing device 110. For example, computing devices 110 are user computing devices (e.g., a cellular device, desktop computer, a tablet, a wearable device, etc.) and requests 102 are requests to initiate one or more online electronic transactions. In the illustrated embodiment, server computer system 120 inputs requested transactions into trained machine learning classifier 145. Based on classifications output by trained machine learning classifier 145 for the requests transactions, server computer system 120 sends transaction decisions 122 to one or more computing devices 110. Transaction decisions 122 indicate whether the requests 102 for transactions are authorized (transactions are allowed to proceed) or not authorized (transactions are rejected).

In order to generate trained machine learning classifier 145, server computer system 120 in the illustrated embodiment retrieves transactions 162 from database 150. Transactions 162 are completed transactions that have been authorized by server computer system 120. Transactions 162 include both fraudulent and non-fraudulent transactions. Transactions 162 make up the general population of transactions (e.g., for PayPal™) that are completed transactions (e.g., authorized and finalized transactions and rejected and terminated transactions). Server computer system 120 selects a subset of transactions 162 to be a control group for the overall transaction population. Transactions 162 stored in database 150 include known labels (e.g., tags indicating whether these transactions are fraudulent or not). For example, database 150 may store transactions that were authorized and allowed to proceed, but were later determined to be fraudulent and labeled as such. As another example, database 150 may store transactions that were approved and were later confirmed to be not fraudulent and are, therefore, stored with a non-fraudulent label. Database 150 may also store various metadata (e.g., features) for transactions 162 that may be used by system 120 when training machine learning classifier 140 and when generating a control group. Server computer system 120 executes control group selection module 130 to train a machine learning model 160 using transactions 162. Machine learning model 160 may be used to generated control groups. This model 160 may be a Dragonnet model combined with a variational auto encoder (VAE), for example. Model 160 may be any of various types of machine learning models or combinations of machine learning models, including neural networks, regression models, decision trees, etc. Model 160 may be combined with other types of auto encoders other than VAEs including regularized autoencoders, concrete autoencoders, etc. The machine learning model 160 is described in detail below with reference to FIGS. 2, 3, and 5.

Control group selection module 130, in the illustrated embodiment, generates an updated control group 134 of transactions from a current set of control group transactions output by machine learning model 160. Server computer system 120, in the illustrated embodiment, trains machine learning classifier 140 using the updated control group 134. Once server computer system 120 is satisfied with the training of machine learning classifier 140, system 120 executes trained machine learning classifier 145 to classify transactions.

During training of machine learning model 160, control group selection module 130 generates an updated control group 134 by adding or removing, or both transactions from a current set of control group transactions selected by model 160 during training based on learning the feature distribution of the selected set of control group transactions and the non-control group transactions selected by model 160.

In this disclosure, a "module" operable to perform designated functions are shown in the figures and described in detail (e.g., control group selection module 130). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC.

Although the disclosed techniques are generally described with reference to transactions, the disclosed machine learning techniques may be implemented to select any of various types of examples for control groups, including, for example, medicine in a clinical trial, fertilizers for plant growth trials, individuals to consume food in food sensitivity tests, etc. In some situations, the disclosed machine learning techniques may be implemented to perform reject inferencing for credit card applications. In such situations, building a control group may be expensive since including credit card applications that have been approved but turn out to be malicious or credit card applications from individuals having a low credit score may cause a credit provider to incur financial loss. Further, declined credit card applications are often under-represented (or, in some cases, not represented at all). As such, the disclosed techniques may be implemented to derive a control group that includes example credit card applications that are cost effective while also being the most representative of the declined (rejected, potentially fraudulent credit card applications) when assessing credit-worthiness.

Example Control Group Selection Module

Figure 2:
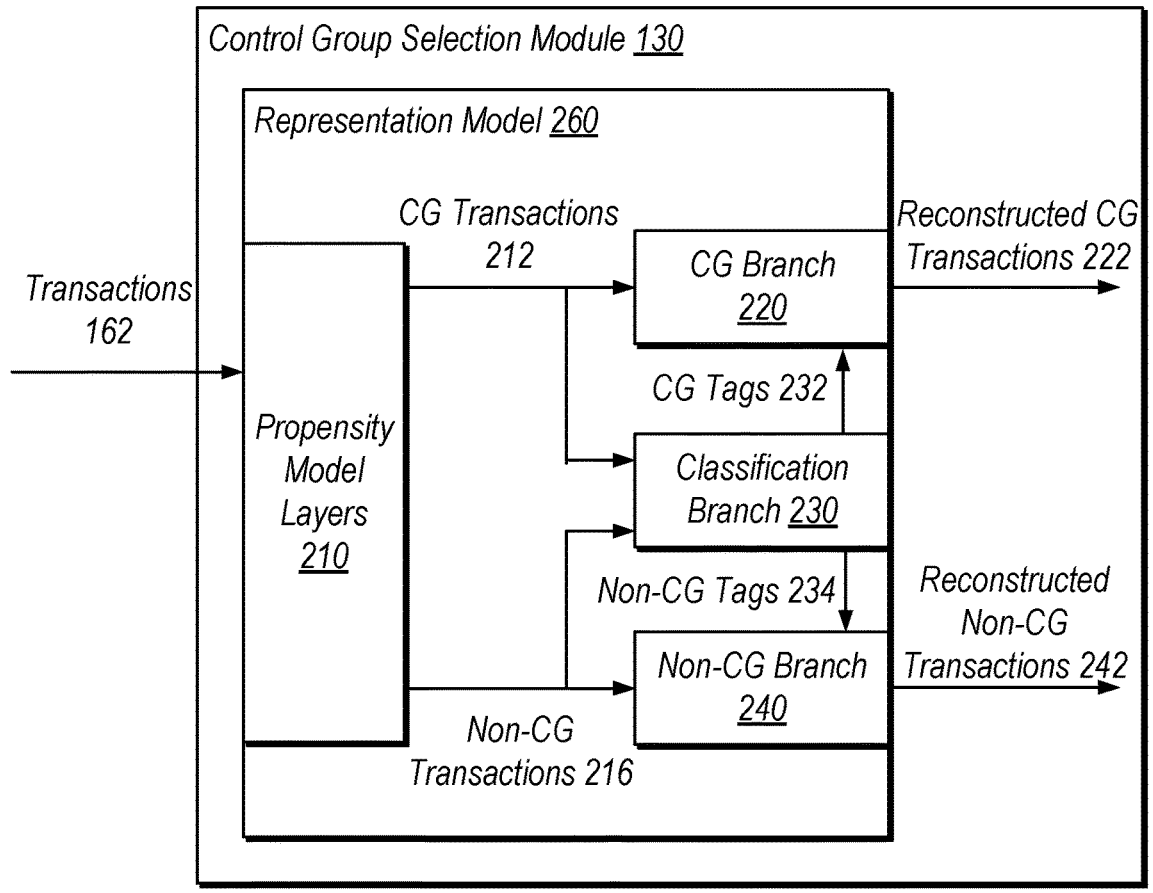
FIG. 2 is a block diagram illustrating example training of a representation model, according to some embodiments.

Turning now to FIG. 2, a block diagram is shown illustrating example training of a representation model. In the illustrated embodiment, a training example 202 is shown in which control group selection module 130 trains representation model 260 (a machine learning model) to identify control group transactions and non-control group transactions. Control group selection module 130 inputs transactions 162 into representation model 260 which outputs both reconstructed CG transactions 222 and reconstructed non-CG transactions 242. In some embodiments, representation model 260 is a Dragonnet model combined with a VAE.

Representation model 260, in the illustrated embodiment, includes propensity model layers 210, CG branch 220, classification branch 230, and non-CG branch 240. Representation model 260 receives transactions 162 as input during training. The propensity model layers 210 of representation model 260 include a neural network layer that calculates propensity scores for transactions 162. Based on these propensity scores, propensity model layers 210 predict whether transactions 162 are either CG transactions 212 or non-CG transactions 216. Representation model 260 sends the predicted CG transactions 212 to the CG branch 220, the non-CG transactions 216 to the non-CG branch 240, and both types of transactions 212 and 216 to classification branch 230. (In this way, CG and non-CG branches 220 and 240 of the representation model 260 are conditioned on the propensity score.)

In some embodiments, during training, representation model 260 predicts, based on a predetermined weight associated with a particular transaction feature, whether transactions included in the plurality of transactions are CG transactions 212 or non-CG transactions 216. During training, control group selection module 130 weights certain features of transactions 162 prior to inputting these transactions into propensity model layers 210. For example, control group selection module 130 artificially weights transactions 162 based on the values of a dollar amount feature of these transactions. As one specific example, module 130 may assign higher weights to transactions that have a low dollar amount feature. In this specific example, the assigned weights cause the propensity model layers 210 to learn to put more emphasis on these transactions, such that representation model 260 is more likely to classify such transactions as CG transactions 212. As another specific example, control group selection module 130 may assign higher weights to a dollar amount feature itself of a given transaction (rather than assigning a weight to the given transaction).

Note that, the weighting performed by module 130 is a way of artificially constraining representation model 260 when classifying transactions, to keep the model from transactions with undesirable features. For example, weighting may prevent the model from selecting high-dollar fraudulent transactions to be control group transactions. After weights are assigned to various transactions (e.g., based on the value of a dollar amount feature), transactions included in the control group do not have the same weights and, therefore, the multi-variable (feature) distribution of the control group is diverse (e.g., the representation model 260 will train harder on some example transactions than others during training). Control group selection module 130 may similarly weight any of various features of transactions, such that representation model 260 trains harder on such features or transactions that include certain values for those features (e.g., a location, an IP address, a type of transaction, etc.).

Propensity model layers 210 execute cost functions during training to predict whether transactions are CG or non-CG. In particular, the cost function executed by propensity model layers 210 may be experimented to be weighted by predetermined weights (e.g., to rectify under-representation of sparsely represented examples) as well as by the value of a dollar amount feature. The cost function might be optimized based on various different underlying objectives (e.g., weighting low-dollar value transactions greater than high-dollar value transactions). In some situations, the cost function is a hybridized set of loss functions that are applicable to a cohort of training examples (e.g., transactions) that can be optimized. In this way, the disclosed techniques not only discover which transaction examples are the most representative of the overall transaction population, but also the transaction examples that are the most cost-effective. This is particularly true given that transactions allocated to control groups are not declined, even if fraudulent. As one example, control group selection module 130 may assign predefined control group weights to transactions during the propensity score calculation performed by propensity model layers 210 to cause representation model 260 to train harder on under-represented types of transactions. Propensity model layers 210 are discussed in further detail below with reference to FIG. 5.

Classification branch 230 of representation model 260 determines tags (i.e., classifications) for both CG transactions 212 and non-CG transactions 216. For example, classification branch 230 determines whether transactions predicted as CG or non-CG by propensity model layers 210 are fraudulent or not. For example, classification branch 230 determines CG tags 232 for respective CG transactions indicating whether these transactions are fraudulent or not. Similarly, classification branch 230 determines non-CG tags 234 for respective non-CG transactions indicating whether these transactions are fraudulent or not. Classification branch 230 sends CG tags 232 corresponding to respective CG transactions 212 to CG branch 220 and sends non-CG tags 234 corresponding to respective non-CG transactions 216 to non-CG branch 240.

CG branch 220 of representation model 260 receives CG transactions 212 from propensity model layers 210 and CG tags 232 from classification branch 230 and generates reconstructed CG transactions 222. In this way, the CG branch 220 of representation model 260 learns the multi-variable distribution of control group transactions. For example, CG branch 220 includes a variational auto encoder that encodes features of CG transactions 212 using an encoder, learns the distribution of these features while they are compressed, and then reconstructs the CG transactions 212 using a decoder. In some embodiments, representation model 260 concatenates CG tags 232 to CG transactions 212 as they are input to CG branch 220. For example, a CG tag 232 corresponding to a given CG transaction 212 will be assigned to that transaction prior to being input to CG branch 220.

In some embodiments, during training, control group selection module 130 compares the CG tags 232 and non-CG tags 234 output by classification branch 230 with known labels for respective transactions. Based on tags output by classification branch 230 not matching (or being more than a threshold amount different from) the known labels for CG transactions 212 and the known labels for non-CG transactions, control group selection module 130 may reinforce the learning of the classification branch 230 to improve the classification accuracy of representation model 260. That is, control group selection module 130 may decide to train representation model 260 further based on this model exhibiting poor classification performance.

Similar to the CG branch 220, the non-CG branch 240 attempts to learn the feature distribution of non-CG transactions 216 by encoding and then decoding these transactions to produce reconstructions 242 of non-CG transactions. In addition, representation model 260 concatenates the non-CG tags 234 output by classification branch 230 to non-CG transactions 216 prior to these transactions being input to non-CG branch 240.

In some embodiments, representation model 260 described above with reference to FIG. 2 includes two separate neural networks that are trained using similar techniques to those discussed below with reference to a single neural network model (e.g., a Dragonnet model) and executed in combination to achieve a similar outcome to a single, multi-branched model. For example, the model 260 shown in FIG. 2 might be implemented using two neural networks, where a first neural network executes the propensity model layers 210 and the CG branch 220, while a second neural network executes the propensity model layers 210 and the non-CG branch 240.

Figure 3:
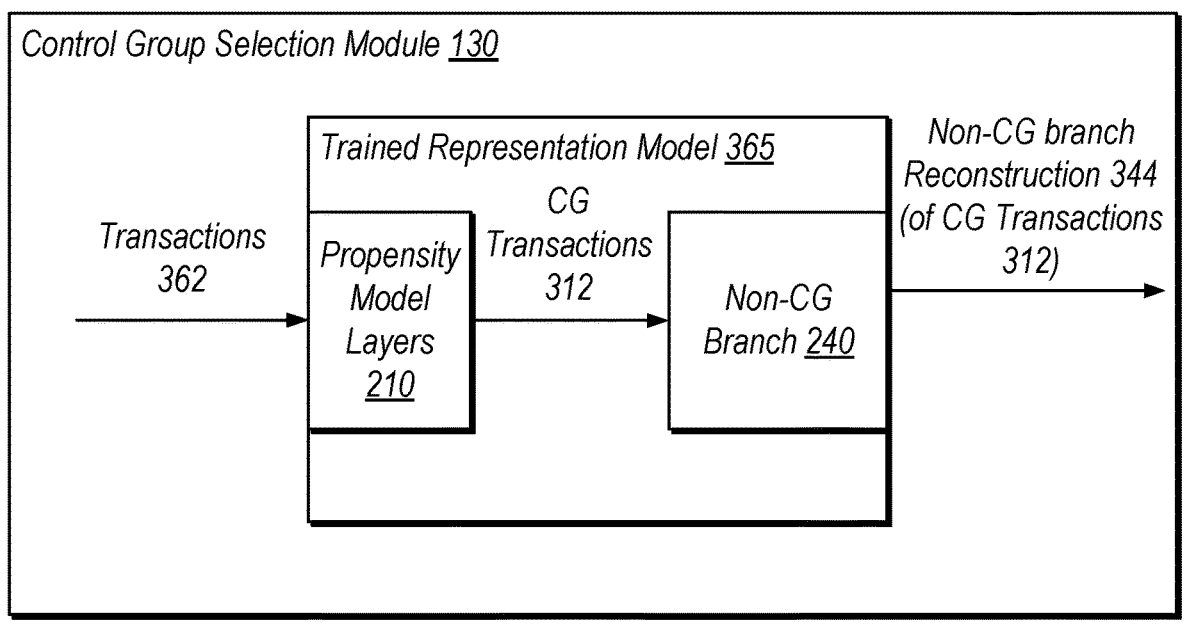
FIG. 3 is a block diagram illustrating example execution of a trained representation model, according to some embodiments.

FIG. 3 is a block diagram illustrating example execution of a trained representation model. In the illustrated embodiment, a trained model execution example 304 is shown in which control group selection module 130 executes a trained representation model 365 (the trained version of the representation machine learning model 260 discussed above with reference to FIG. 2).

In the illustrated embodiment, example 304 shows the situation in which control group selection module 130 inputs transactions 362 (which might be the same as transactions 162) to trained representation model 365. The propensity model layers 210 predict which of the transactions 362 are CG transactions 312. Control group selection module 130 then causes trained representation model 365 to input CG transactions 312 into the non-CG branch 240. Non-CG branch 240 outputs a reconstruction 344 of the CG transactions 312. Non-CG branch 240 reconstructs the CG transactions 312 by feeding the CG transactions through an encoder and decoder pipeline that previously learned the distribution of non-CG transactions. If the non-CG branch 240 is able to accurately reconstruct the CG transactions 312, then these transactions are representative of the overall transaction population. Said another way, if non-CG branch 240, which knows the feature distribution of non-CG transactions, is able to recreate CG transactions, then these CG transactions have the same or similar feature distribution to non-CG transactions. The determination of whether the reconstructions 344 of CG transactions 312, generated by non-CG branch 240, are similar to the original CG transactions 312 is discussed in detail below with reference to FIG. 4.

Example Divergence

Figure 4:
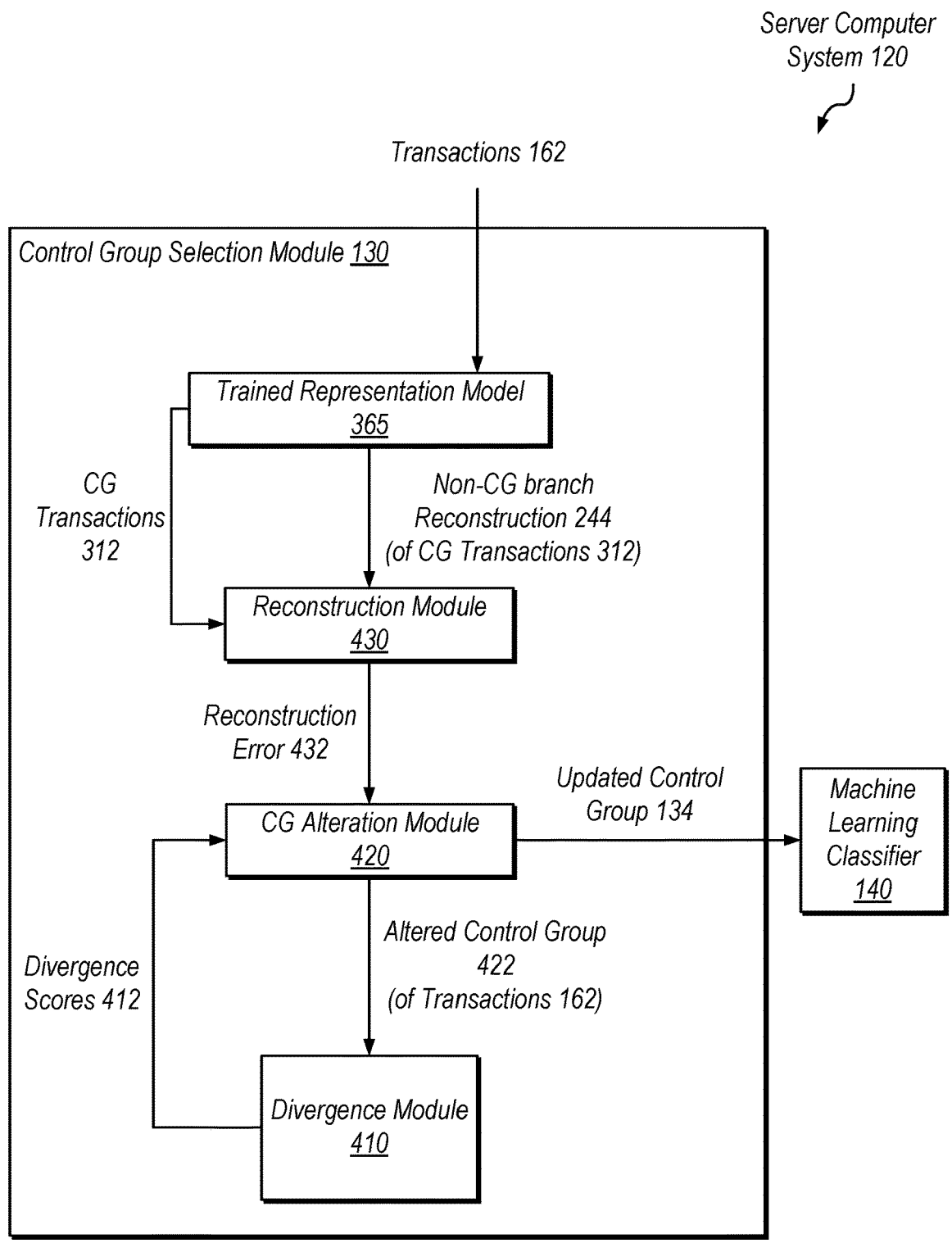
FIG. 4 is a block diagram illustrating an example divergence module, according to some embodiments.

Turning now to FIG. 4, a block diagram is shown illustrating an example divergence module. In the illustrated embodiment, server computer system 120 includes machine learning classifier 140 and control group selection module 130, which in turn includes trained representation model 365, reconstruction module 430, control group alteration module 420, and divergence module 410.

In the illustrated embodiment, control group selection module 130 executes trained representation model 365 by inputting transactions 562 (which might be the same as transactions 162 and/or 362) into the model 265. Control group selection module 130 then inputs the reconstruction 244 of CG transactions 312 output by trained representation model 365 and the CG transactions 312 predicted by propensity model layers 210 of model 265 (such as those shown in FIG. 3) into reconstruction module 430.

Reconstruction module 430, in the illustrated embodiment, determines reconstruction error 432 for one or more of the reconstructions 244 of CG transactions 312 generated by the non-CG branch 240 of model 265 (as shown in FIG. 3). For example, reconstruction module 430 determines a different between CG transactions 312 and their corresponding reconstructions 244. The reconstruction error 432 output by reconstruction module 430 indicates the error of the non-CG branch 240 when reconstructing CG transactions 312. In this example, any CG transactions that the non-CG branch of trained representation model 365 is not able to reconstruct within some threshold accuracy is not representative of the overall population of transactions.

Control group alteration module 420, in the illustrated embodiment, removes transactions from the current set of CG transactions 312 based on these transactions having a threshold amount of reconstruction error 432. Said another way, if the non-CG branch was not able to accurately reconstruct various CG transactions, then these transactions may be removed from the current control group. Transactions having the least amount of reconstruction error will be more representative of the overall transaction population than transactions with a greater amount of reconstruction error. In this way, control group alteration module 420 identifies and selects a subset of transactions from a current set of CG transactions 312, adds additional non-CG transactions, removes unrepresentative transactions, etc. to generate an altered control group 422 of transactions 562 (i.e., control group alteration module 420 selects a set of transactions from the general transaction population that are the most representative of the overall transaction population).

Control group selection module 130, in the illustrated embodiment, inputs the altered control group 422 into divergence module 410. Divergence module 410 determines various divergence scores 412 for the current set of CG transactions 312 and the altered control group 422 generated by control group alteration module 420. Divergence module 410 executes a divergence algorithm to determine a difference between a current set of CG transactions 312 and non-CG transactions (transactions not included in the control group). Divergence module 410 also executes a divergence algorithm to determine a difference between the altered control group 422 and non-CG transactions. For example, control group selection module 130 performs a verification process for the altered control group 422 prior to using this control group for training, testing, etc. In this example, divergence module 410 may execute a Kullback-Leibler (KL) divergence algorithm to measure the difference between two probability distributions (a current control group and the overall non-CG population as well as the altered control group 422 and the overall non-CG population).

Control group alteration module 420 may compare the divergence scores 412 output by divergence module 410 for the current set of CG transactions 312 and the altered control group 422 to ensure that the altered control group 422 did indeed improve the representativeness of the control group relative to the original (current set) of CG transactions 312. In this way, module 130 ensures that the updates to the control group (e.g., adding or removing example transactions) have not significantly increased the divergence between the CG and non-CG populations (relative to the divergence between the original CG transaction and non-CG transactions), but rather have decreased (improved) the divergence.

In the illustrated embodiment, control group alteration module 420 outputs an updated control group 134. The updated control group 134 may be the same as altered control group 422 or may be a further altered version of altered control group 422. In some embodiments, based on comparing the two divergence scores 412 (e.g., divergence of the altered control group has increased relative to the divergence measured between the original control group and the non-CG population), control group alteration module 420 performs additional alterations to the updated control group 134. For example, based on comparing the two divergence scores 412, control group alteration module 420 may further determine to remove and/or add transactions to altered control group 422 to generate updated control group 134. Server computer system 120, in the illustrated embodiment, uses the transactions in the updated control group 134 to train a machine learning classifier 140 as discussed above with reference to FIG. 1.

Example Dragonnet VAE

Figure 5:
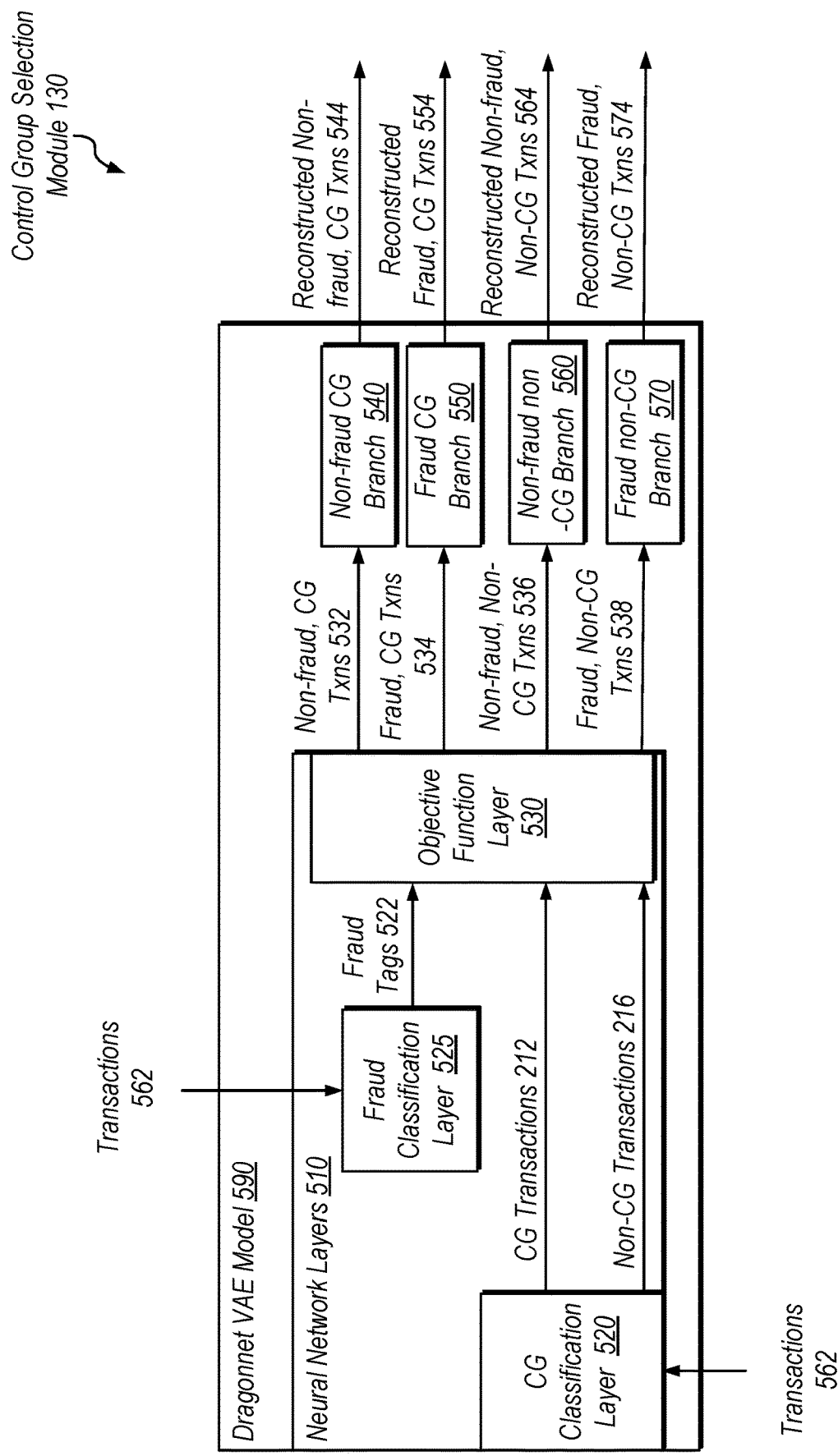
FIG. 5 is a block diagram illustrating an example Dragonnet variational auto encoder (VAE) with multiple different branches, according to some embodiments.

Turning now to FIG. 5, a block diagram is shown illustrating an example Dragonnet VAE with multiple different branches. Dragonnet VAE model 590, in the illustrated embodiment, includes non-fraud CG branch 540, fraud CG branch 550, non-fraud non-CG branch 560, fraud non-CG branch 570, and neural network layers 510 (one example of propensity model layers 210), which in turn include a CG classification layer 520, a fraud classification layer 525, and an objective function layer 530. In some embodiments, the Dragonnet VAE model 590 includes multiple separate VAE branches for reconstructing and learning the feature distribution of respective combinations of fraudulent, non-fraudulent, control group, and non-control group transactions.

Dragonnet VAE model 590, in the illustrated embodiment, receives transactions 562 and inputs them to CG classification layer 520 and fraud classification layer 525. CG classification layer 520 determines whether transactions 562 are CG transactions 212 or non-CG transactions 216. Based on these classifications, neural network layers 510 calculate a classification loss function to determine the accuracy of the CG classification layer 520 in predicting whether transactions are control group transactions or not. Neural network layers 510 send CG transactions 212 and non-CG transactions 216 to objective function layer 530. Fraud classification layer 525 determines whether transactions 562 are fraudulent or not. Based on the fraud tags 522 for respective transactions 562, neural network layers 510 calculate a classification loss function to determine the accuracy of fraud classification layer 525 in predicting whether transactions are fraudulent or not. Fraud classification layer sends fraud tags 522 (indicating fraudulent or not fraudulent) to objective function layer 530.

Objective function layer 530, in the illustrated embodiment, combines fraud tags 522 with appropriate CG transactions 212 and non-CG transactions 216 and sends the appropriate transactions to the corresponding branches 540-570. For example, objective function layer 530 sends non-fraud CG transactions 532 to non-fraud CG branch 540, fraud CG transactions 534 to fraud CG branch 550, non-fraud non-CG transactions 536 to non-fraud non-CG branch 560, and fraud non-CG transactions 538 to fraud non-CG branch 570. Objective function layer 530 minimizes an objective function that includes the combination of the two different losses calculated by CG classification layer 520 and fraud classification layer 525. (Although not shown in FIG. 5, layers 520 and 525 pass the results of calculating their respective loss functions to objection function layer 530.) Non-fraud CG branch 540, in the illustrated embodiment, outputs reconstructions 544 of non-fraud CG transactions. Fraud CG branch 550, in the illustrated embodiment, outputs reconstructions 554 of fraud CG transactions. Non-fraud non-CG branch 560, in the illustrated embodiment, outputs reconstructions 564 of non-fraud non-CG transactions. Fraud non-CG branch 570, in the illustrated embodiment, outputs reconstructions 574 of fraudulent non-CG transactions.

Example Method

FIG. 6 is a flow diagram illustrating a method 600 for automatically updating a control group, according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, server computer system 120 performs the elements of method 600.

At 610, in the illustrated embodiment, a server computer system trains, using a plurality of transactions, a machine learning model, where during training the machine learning model learns a feature distribution of both a current set of control group (CG) transactions and a current set of non-control group (non-CG) transactions included in the plurality of transactions. In some embodiments, during training, the machine learning model predicts, based on a predetermined weight associated with a particular transaction feature, whether transactions included in the plurality of transactions are to be included in the current set of CG transactions or the current set of non-CG transactions. For example, the disclosed system may assign greater weight to transactions having a larger value for a dollar amount feature and may assign less weight to transactions having a smaller value for the dollar amount feature, such than the machine learning model trains harder on the transactions having larger values for the dollar amount feature. In addition, the assignment of weights may be based on a classification for transactions (e.g., whether the transaction is fraudulent or not). In some embodiments, this causes the disclosed machine learning model to select low-dollar amount transactions to be included in a control group of transactions.

In some embodiments, training the machine learning model further includes concatenating output of a third portion of the machine learning model indicating classifications for CG transactions to transactions input to a portion of the machine learning model for reconstructing CG transactions. In some embodiments, training the machine learning model further includes concatenating output of the third portion of the machine learning model indicating classifications for non-CG transactions to transactions input to a portion of the machine learning model for reconstructing non-CG transactions.

At 620, the server computer system inputs, into the trained machine learning model, the current set of CG transactions. In some embodiments, the inputting includes inputting the current set of CG transactions into a non-CG portion of the machine learning model, where the current set of CG transactions that are predicted by the machine learning model during training are predicted by a CG portion of the machine learning model. The machine learning model may be a Dragonnet model with a CG branch and a non-CG branch. In some embodiments, both a CG portion and a non-CG portion of the Dragonnet model are executed using variational auto encoders (VAEs). In some embodiments, a third portion of the Dragonnet model classifies transactions. In some embodiments, predicting whether transactions included in the plurality of transactions are CG transactions or non-CG transactions is further based on one or more predefined weights for one or more transaction included in the plurality of transactions.

At 630, a server computer system modifies, based on output of the trained machine learning model for the current set of CG transactions, the current set of CG transactions to generate an updated set of CG transactions. In some embodiments, modifying the current set of CG transactions includes determining reconstruction error of the non-CG portion of the machine learning model by comparing reconstructions of CG transactions output by the non-CG portion with corresponding CG transactions. In some embodiments, modifying the current set of CG transactions includes removing, based on the reconstruction error, one or more CG transactions from the current set of CG transactions to generate the updated set of CG transactions. In some embodiments, the machine learning model includes: a branch for reconstructing non-suspicious CG transactions, a branch for reconstructing suspicious CG transactions, a branch for reconstructing non-suspicious non-CG transactions, and a branch for reconstructing suspicious non-CG transactions.

In some embodiments, modifying the current set of CG transactions based on output of the non-CG portion of the machine learning model further includes performing a first comparison using a divergence algorithm, including comparing transactions in the current set of CG transactions with non-CG transactions included in the plurality of transactions. In some embodiments, modifying the current set of CG transactions further includes performing a second comparison using the divergence algorithm, wherein performing the divergence algorithm includes comparing transactions in the updated set of CG transactions with non-CG transactions included in the plurality of transactions. In some embodiments, modifying the current set of CG transactions further includes comparing results of the first comparison and the second comparison and, based on comparing the results, adding one or more non-CG transactions to the updated set of CG transactions. In some embodiments, based on comparing the results, the modifying includes removing one or more non-CG transactions from the updated set of CG transactions. In some embodiments, the divergence algorithm is a KL divergence algorithm, a contrastive divergence algorithm, a restricted Boltzmann machine, etc.

At 640, the server computer system performs, based on the updated set of CG transactions, one or more preventative measures for a transaction processing system. In some embodiments, performing the one or more preventative measures includes training, using the updated set of CG transactions, a machine learning classifier, where the trained machine learning classifier is usable to generate an authorization decision for newly requested transactions. For example, if a user computing device requests to initiate an online electronic transaction, server computer system 120 (or some other system) may execute the trained machine learning classifier to determine a suspiciousness classification for the requested electronic transaction. Based on the suspiciousness classification indicating that the requested electronic transaction is fraudulent, the server computer system 120 may deny the requested transaction.

Example Computing Device

Figure 7:
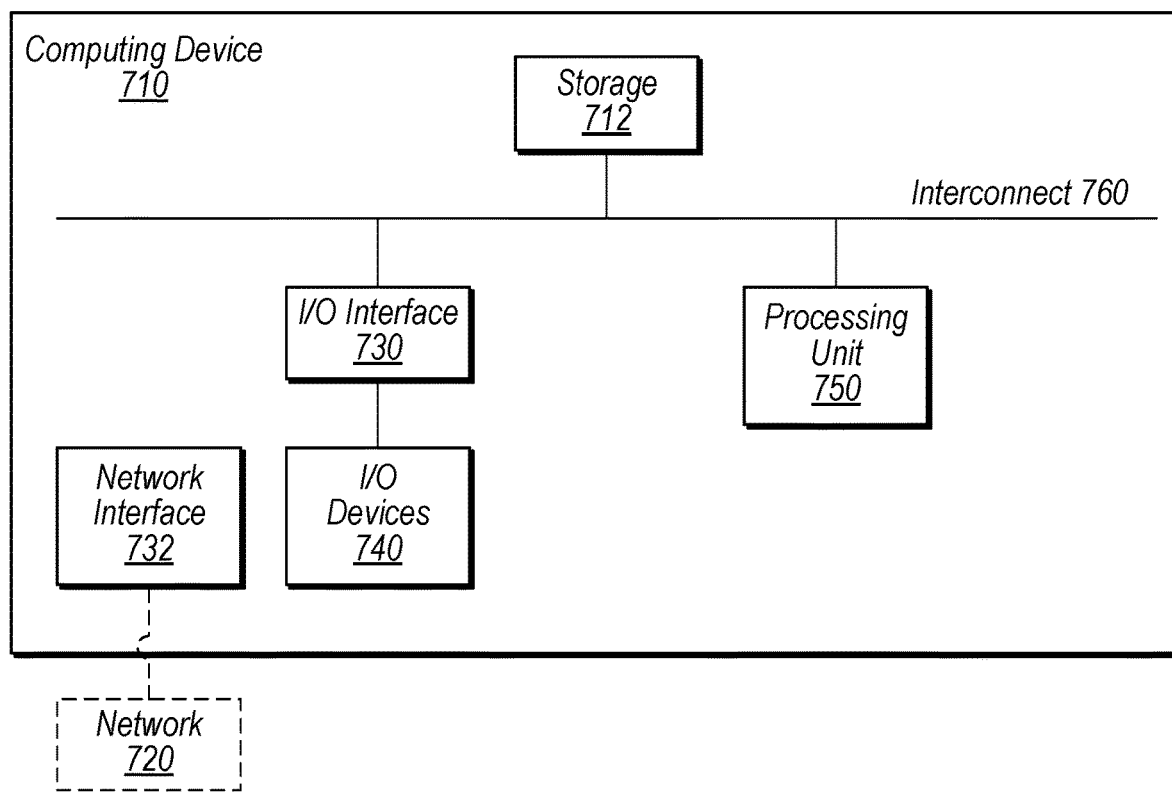
FIG. 7 is a block diagram illustrating an example computing device, according to some embodiments.

Turning now to FIG. 7, a block diagram of one embodiment of computing device 710 (which may also be referred to as a computing system) is depicted. Computing device 710 may be used to implement various portions of this disclosure. Computing device 710 may be any suitable type of device, including, but not limited to, a personal computer system, desktop computer, laptop or notebook computer, mainframe computer system, web server, workstation, or network computer. The server computing system 120 shown in FIG. 1 and discussed above is one example of computing device 710. As shown, computing device 710 includes processing unit 750, storage 712, and input/output (I/O) interface 730 coupled via an interconnect 760 (e.g., a system bus). I/O interface 730 may be coupled to one or more I/O devices 740. Computing device 710 further includes network interface 732, which may be coupled to network 720 for communications with, for example, other computing devices.

In various embodiments, processing unit 750 includes one or more processors. In some embodiments, processing unit 750 includes one or more coprocessor units. In some embodiments, multiple instances of processing unit 750 may be coupled to interconnect 760. Processing unit 750 (or each processor within 750) may contain a cache or other form of on-board memory. In some embodiments, processing unit 750 may be implemented as a general-purpose processing unit, and in other embodiments it may be implemented as a special purpose processing unit (e.g., an ASIC). In general, computing device 710 is not limited to any particular type of processing unit or processor subsystem.

Storage subsystem 712 is usable by processing unit 750 (e.g., to store instructions executable by and data used by processing unit 750). Storage subsystem 712 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 712 may consist solely of volatile memory, in one embodiment. Database 150, discussed above with reference to FIG. 1 is one example of storage subsystem 712. Storage subsystem 712 may store program instructions executable by computing device 710 using processing unit 750, including program instructions executable to cause computing device 710 to implement the various techniques disclosed herein.

I/O interface 730 may represent one or more interfaces and may be any of various types of interfaces configured to couple to and communicate with other devices, according to various embodiments. In one embodiment, I/O interface 730 is a bridge chip from a front-side to one or more back-side buses. I/O interface 730 may be coupled to one or more I/O devices 740 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
    training, by a server computer system using a plurality of transactions, a machine learning model, wherein during training the server computer system:
        causes a first portion of the machine learning model to learn a feature distribution of a current set of control group (CG) transactions;
        causes a second portion of the machine learning model to learn a feature distribution of a current set of non-control group (non-CG) transactions included in the plurality of transactions; and
        concatenates output of a third portion of the machine learning model indicating classifications for CG transactions to transactions input to a portion of the machine learning model for reconstructing CG transactions; and
    inputting, by the server computer system into the trained machine learning model, the current set of CG transactions;
    modifying, by the server computer system based on output of the trained machine learning model for the current set of CG transactions, the current set of CG transactions to generate an updated set of CG transactions; and performing, by the server computer system based on the updated set of CG transactions, one or more preventative measures for a transaction processing system.

2. The method of claim 1, wherein further during training, the machine learning model predicts, based on a predetermined weight associated with a particular transaction feature, whether transactions included in the plurality of transactions are to be included in the current set of CG transactions or the current set of non-CG transactions.

3. The method of claim 2, wherein the inputting includes inputting the current set of CG transactions into a non-CG portion of the machine learning model, and wherein the current set of CG transactions predicted by the machine learning model during training are predicted by a CG portion of the machine learning model.

4. The method of claim 2, wherein predicting whether transactions included in the plurality of transactions are CG transactions or non-CG transactions is further based on one or more predefined weights for one or more transactions included in the plurality of transactions.

5. The method of claim 2, wherein training the machine learning model further includes:
concatenating output of the third portion of the machine learning model indicating classifications for non-CG transactions to transactions input to a portion of the machine learning model for reconstructing non-CG transactions.

6. The method of claim 1, wherein performing the one or more preventative measures includes:
training, using the updated set of CG transactions, a machine learning classifier, wherein the trained machine learning classifier is usable to generate an authorization decision for newly requested transactions.

7. The method of claim 1, wherein the machine learning model is a Dragonnet model, wherein the first portion of the Dragonnet model is a CG portion and the second portion of the Dragonnet model is a non-CG portion, wherein the CG portion and the non-CG portion of the Dragonnet model are executed using variational auto encoders (VAEs), and wherein the third portion of the Dragonnet model classifies transactions.

8. The method of claim 7, wherein modifying the current set of CG transactions includes:
determining reconstruction error of the non-CG portion of the Dragonnet model by comparing reconstructions of CG transactions output by the non-CG portion with corresponding CG transactions; and
removing, based on the reconstruction error, one or more CG transactions from the current set of CG transactions to generate the updated set of CG transactions.

9. The method of claim 1, wherein the machine learning model includes: a branch for reconstructing non-suspicious CG transactions, a branch for reconstructing suspicious CG transactions, a branch for reconstructing non-suspicious non-CG transactions, and a branch for reconstructing suspicious non-CG transactions.

10. A non-transitory computer-readable medium having instructions stored thereon that are executable by a server computer device to perform operations comprising:
training, using a plurality of transactions, a machine learning model, wherein during training the machine learning model:
learns a feature distribution of both a current set of control group (CG) transactions and a current set of non-control group (non-CG) transactions included in the plurality of transactions; and
concatenates output of a portion of the machine learning model indicating classifications for non-CG transactions to transactions input to a portion of the machine learning model for reconstructing non-CG transactions; and
inputting, into the trained machine learning model, the current set of CG transactions;
modifying, based on output of the trained machine learning model for the current set of CG transactions, the current set of CG transactions to generate an updated set of CG transactions; and
performing, based on the updated set of CG transactions, one or more preventative measures for a transaction processing system configured to process newly received transactions.

11. The non-transitory computer-readable medium of claim 10, wherein further during training the machine learning model predicts, based on a predetermined weight associated with a particular transaction feature, whether transactions included in the plurality of transactions are to be included in the current set of CG transactions or the current set of non-CG transactions.

12. The non-transitory computer-readable medium of claim 11, wherein predicting whether transactions included in the plurality of transactions are CG transactions or non-CG transactions is further based on one or more predefined weights for one or more transactions included in the plurality of transactions.

13. The non-transitory computer-readable medium of claim 10, wherein the inputting includes inputting the current set of CG transactions into a non-CG portion of the machine learning model, and wherein the current set of CG transactions predicted by the machine learning model during training are predicted by a CG portion of the machine learning model.

14. The non-transitory computer-readable medium of claim 13, wherein modifying the current set of CG transactions includes:
determining reconstruction error of the non-CG portion of the machine learning model by comparing reconstructions of CG transactions output by the non-CG portion with corresponding CG transactions; and
removing, based on the reconstruction error, one or more CG transactions from the current set of CG transactions to generate the updated set of CG transactions.

15. The non-transitory computer-readable medium of claim 14, wherein modifying the current set of CG transactions based on output of the non-CG portion of the machine learning model further includes:
performing a first comparison using a divergence algorithm, including comparing transactions in the current set of CG transactions with non-CG transactions included in the plurality of transactions;
performing a second comparison using the divergence algorithm, wherein performing the divergence algorithm includes comparing transactions in the updated set of CG transactions with non-CG transactions included in the plurality of transactions;
comparing results of the first comparison and the second comparison; and
based on comparing the results, adding one or more non-CG transactions to the updated set of CG transactions.

16. The non-transitory computer-readable medium of claim 10, wherein performing the one or more preventative measures includes:

training, using the updated set of CG transactions, a machine learning classifier, wherein the trained machine learning classifier is usable to generate an authorization decision for newly requested transactions.

17. A system, comprising:
at least one processor; and
a memory having instructions stored thereon that are executable by the at least one processor to cause the system to:
  train, using a plurality of transactions, a machine learning model, wherein during training the machine learning model:
    predicts, based on a predetermined weight for a particular transaction feature, whether transactions included in the plurality of transactions are to be included in a current set of CG transactions or a current set of non-CG transactions;
    learns a feature distribution of both the current set of CG transactions and the current set of non-CG transactions; and
    concatenates output of a portion of the machine learning model indicating classifications for CG transactions to transactions input to a portion of the machine learning model for reconstructing CG transactions; and
  input, into the trained machine learning model, the current set of CG transactions predicted by the machine learning model during training;
  modify, based on output of the trained machine learning model for the current set of CG transactions, the current set of CG transactions to generate an updated set of CG transactions; and
  perform, based on the updated set of CG transactions, one or more preventative measures for a transaction processing system.

18. The system of claim 17, wherein the inputting includes inputting the current set of CG transactions into a non-CG portion of the machine learning model, and wherein the current set of CG transactions predicted by the machine learning model during training are predicted by a CG portion of the machine learning model.

19. The system of claim 18, wherein modifying the current set of CG transactions includes:
  determining reconstruction error of the non-CG portion of the machine learning model by comparing reconstructions of CG transactions output by the non-CG portion with corresponding CG transactions; and
  removing, based on the reconstruction error, one or more CG transactions from the current set of CG transactions to generate the updated set of CG transactions.

20. The system of claim 17, wherein the machine learning model is a Dragonnet model, and wherein both a CG portion and a non-CG portion of the Dragonnet model are executed using variational auto encoders (VAEs), and wherein a third portion of the Dragonnet model classifies transactions.

* * * * *